Fig. 3A — Base Emitter Voltage Transistor T-1 (Transister Non-Conductive)

Fig. 3B — Base Emitter Voltage Transistor T-1 (Transistor Conductive)

Fig. 3C — Base Emitter Voltage Transistors T2 Thru T6

Fig. 3D — Armature Voltage

INVENTOR.
Hans R. A. Hansen
BY
Byron Hume Groen & Clement
Attys.

United States Patent Office 3,092,766
Patented June 4, 1963

3,092,766
SPEED REGULATING SYSTEM
Hans R. A. Hansen, Milwaukee, Wis., assignor to The Louis Allis Co., Milwaukee, Wis., a corporation of Wisconsin
Filed Mar. 1, 1960, Ser. No. 12,201
4 Claims. (Cl. 318—341)

The present invention relates to control systems and, in particular, to control systems for regulating the speed of an electrical driving apparatus.

It is an object of the present invention to provide a new and improved control system that accurately regulates the speed of an electrical apparatus.

It is another object of the present invention in accordance with the previous object to regulate the amount of voltage supplied to the armature of an electrical driving apparatus.

It is a further object of the present invention to provide a sensitive and accurate control system for instantaneously accelerating or decelerating an electrical driving apparatus.

It is yet another object of the present invention to provide a control system that provides infinitely adjustable, speed regulation for an electrical driving apparatus.

It is another object of the present invention to regulate the speed of an electrical driving apparatus by providing a control system which is embodied in the armature circuit of the driving apparatus.

It is yet another object of the present invention to provide a control system that controls the average voltage supplied to the armature circuit of an electrical driving apparatus, thereby to regulate its speed.

It is a further object in accordance with the previous object to control the time duration of voltage pulses supplied to the armature circuit in order to control the average armature voltage and thereby regulate the speed of the apparatus.

The above and other objects are realized in accordance with the present invention by providing a new and improved control system for an electrical driving apparatus, for example a D.C. motor. The control system is sensitive and accurate in operation and provides infinitely adjustable, speed regulation for the motor. The system is associated with the armature circuit of the D.C. motor and, to this end, supplies a plurality of voltage pulses to the armature circuit. The voltage pulses produce an average armature voltage which in accordance with the well known motor principle, i.e., $$\text{r.p.m.} = \frac{V_A}{\phi}$$

determines the speed of the motor (r.p.m.=speed, $V_A$=armature voltage, and $\phi$=flux of field winding). In order to change the speed of the motor, the average armature voltage is either increased or decreased by changing the character of the voltage pulses, for example, by changing the time duration of the voltage pulses. The control system is able to smoothly start the motor from a dead stop with an optimum designated acceleration. The acceleration of the motor is controllable and the speed is infinitely adjustable, i.e., the system can be adjusted to cause the motor to rotate at any one of an infinite number of speeds between off and maximum rated speed.

The invention, both as to its organization and method of operation, taken with further objects and advantages thereof, will best be understood by reference to the following description taken in connection with the accompanying drawing, in which:

FIGS. 3A, 3B, 3C and 3D are graphic views of wave forms at selected points in the control system of FIG. 1.

Figure 1:
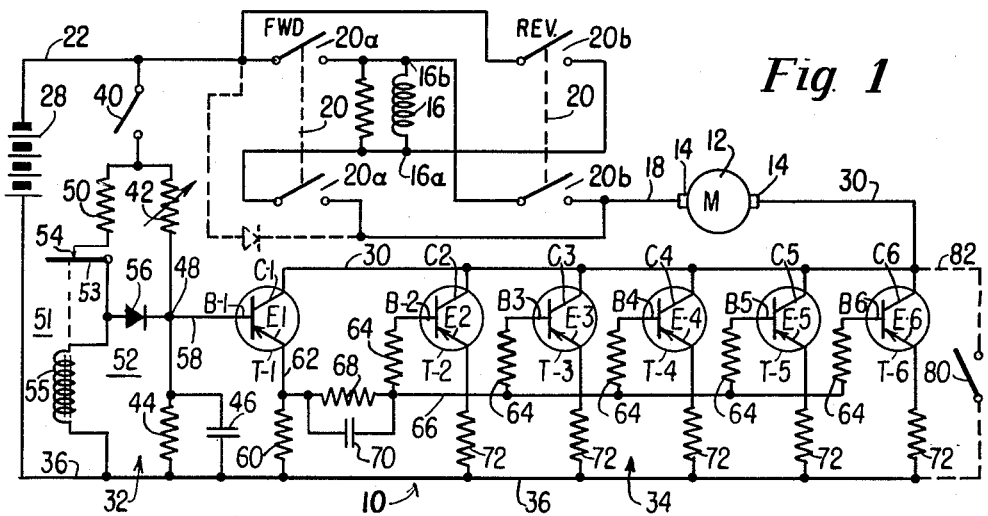
FIGURE 1 is a schematic view of a control system, embodying the features of the present invention, and of a series D.C. motor operatively associated with the system.
Figure 2:
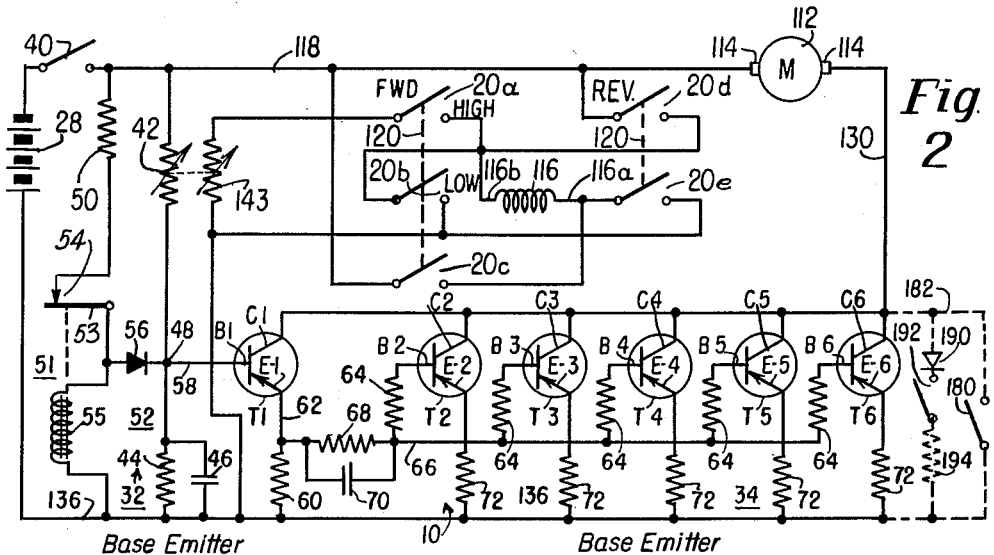
FIG. 2 is a schematic view of the control system of FIG. 1 and of a shunt D.C. motor operatively associated with the system.

Referring now to the drawing, a control system embodying the principles of the present invention is illustrated in both FIGS. 1 and 2 and is identified by reference numeral 10. The control system operates to regulate the speed of an electrical driving apparatus, for example, a D.C. electric motor; it has particularly utility in controlling a D.C. motor drivingly associated with a golf cart or the like. The control system has proven to be an inexpensive and dependable speed-regulating arrangement for the golf cart motor, but since the control system has a wide range of applications, the present invention should not be construed as being limited to use with a golf cart motor.

In any event, the control system 10 is illustrated in FIG. 1 as controlling the speed of a D.C. motor of the series type, while the control system 10 is illustrated in FIG. 2 as controlling the speed of a D.C. motor of the shunt type. In each application, the control system 10 is associated with the armature circuit of the D.C. motor and is operative to produce a plurality of repetitive D.C. voltage pulses as shown in FIG. 3D which develop an average voltage for the armature circuit. By suitable adjustment of the control system 10, the characteristics of the voltage pulses can be changed, for example, the width of each pulse can be altered as explained hereinafter with regard to FIGS. 3A to 3D, thereby changing the average armature voltage of the motor. Since the speed of the motor is directly proportional to the armature voltage, the speed of the motor is immediately changed in response to adjustment of the control system 10.

Referring now to FIG. 1 in greater detail, the D.C. motor 12, which is regulated by the control system 10, is of conventional construction and embodies a series armature winding 14, illustrated diagrammatically, and a series field winding 16 serially connected with the armature winding 14 by a suitable conductor 18. As is well known, the direction of rotation of the motor 12 is dependent upon the direction of current flow through the field winding 16 and, in this connection, a reversing switch 20 is employed to reverse the connections of the field winding 16. More specifically, if clockwise rotation, for example, of the motor is desired, the contacts 20a of the switch 20 are closed, thereby to electrically connect the field winding end 16a to the armature winding 14 and the field winding end 16b to a conductor 22. On the other hand, if counterclockwise rotation of the motor is desired, the contacts 20b of switch 20 are closed, thereby to connect the field winding end 16b to the armature winding 14 and the field winding end 16a to the conductor 22. Irrespective of the way in which the field winding 16 is connected, the circuit for the field winding 16 and the armature winding are serially connected together, the field winding 16 being connected via conductor 22 to the negative side of a battery 28 and the armature winding 14 being connected via conductor 30 to the control system 10. To complete the circuit, the control system 10 is connected via conductor 36 to the positive side of the battery 28.

The control system 10, in operation, actually modifies the D.C. voltage developed by the battery 28 and, accordingly, controls the voltage that appears across the armature winding 14 of the motor 12. More specifically, the system 10 comprises a regulating section 32 connected in shunt across the power supply 28, i.e., between the conductors 22 and 36, and further, a voltage-producing section 34 serially connected between the conductor 36 battery 28) and the conductor 30 (armature winding 14). Briefly, the regulating section 32 of the system operates to control the input to the voltage-producing section 34, whereby the voltage-producing section 34 modifies the battery voltage in a predetermined way. Actually, the section 34 supplies to the armature circuit repetitive D.C. pulses having constant amplitudes, each voltage pulse having a pulse width (or time duration) corresponding to the type of input signal developed by the regulating section 32.

Considering first the regulating section 32, it comprises an on-off switch 40 serially connected to a parallel branch circuit, the right branch of which develops the input signal which is fed to the section 34. It will be appreciated that when the switch 40 is opened, no armature voltage is developed by the system 10 and, hence, the motor 12 is inoperative. However, when the switch 40 is closed, armature voltage may or may not be developed, depending upon the condition of the control system 10 and, in particular, the regulating section 32. In any event, the right branch of the parallel circuit, as seen in FIG. 1, includes a variable resistor 42 of relatively high resistance serially connected to a shunt arrangement comprising a resistor 44 and a capacitor 46, the junction of the variable resistor 42 and the shunt arrangement 44—46 being identified as 48. The left branch of the parallel circuit comprises a resistor 50 serially connected with a vibrator 51 of a vibrator-diode arrangement 52 which functions to convert the D.C. voltage of the battery 28 into a pulsating voltage. The vibrator 51 more specifically includes contacts 54, armature 53, and a serially connected field coil 55 having its lower end connected to the positive terminal of the battery 28 via conductor 36. The contacts 54 are periodically opened and closed by the vibrator coil armature 53 in a manner well known to those skilled in the art. Specifically, upon closure of the manual switch 40 current flows in a path from battery 28 via the resistor 50, contact 54, armature 53 and field coil 55 thereby generating a flux in the core of the field coil which attracts the armature 53 and interrupts the current path at the contacts 54. Thereupon, the flux field collapses permitting the current path again to be completed at armature 53 and contacts 54 and the flux again to be generated in the core of the field coil. Thus, the contacts 54 are opened and closed at a cyclic rate. A rectifier 56 of the vibrator-diode arrangement 52 is electrically connected between the junction of the armature 53 and the coil 55 and the junction 48.

It should be understood that, irrespective of the setting of the variable resistor 42, there is produced at the left side of the rectifier 56, i.e., at the junction of the armature 53 and the coil 55, a pulsating voltage of reversing polarity (hereinafter called vibrator pulsating voltage) is developed by the electric energy building up and collapsing within the coil 55 in response to opening and closing of the contacts 54. The vibrator pulsating voltage is determined by the formula $$E = N\frac{d\phi}{dt}$$

where N is the number of turns in the coil 55 and $$\frac{d\phi}{dt}$$

is the time rate of change flux. Inasmuch as the contacts 54 are opened and closed quite abruptly, the time rate of change of flux is quite large and this in conjunction with the large number of turns in the coil 55 generates a pulsating voltage of a mangitude considerably greater than the magnitude B+ of the battery 28. As the resistor 50 is a relatively high impedance as compared to the impedance of coil 55, the base voltage at the junction between the armature 53 and the coil 55 will be at battery potential B+ and the voltage swing due to the vibrator pulsating voltage will be above and below battery potential B+. Because of the action of the rectifier 56, only those portions of the vibrator pulsating voltage that are more positive than the D.C. voltage at the junction 48 appear at that junction. The voltage at junction 48 is determined in part by the setting of the resistor 42.

Considering the operation of the regulating section 32 when the variable resistor 42 is set at its highest value, the composite voltage appearing at the junction 48 has the wave form illustrated in FIG. 3A. As shown, the voltage at junction 48 comprises a pulsating voltage at a level above the positive potential B+ of the battery 28. The composite wave form is as follows: at the moment of closing of the switch 40, the quiescent voltage at the junction 48 is equal to the positive voltage B+ of the battery 28 inasmuch as resistor 42 is a very high impedance and substantially no current flows through resistors 42 and 44. Accordingly, the condenser 46 has a substantially zero charge.

However, as soon as the vibrator 51 starts to produce its vibrator pulsating voltage above and below the quiescent voltage B+, positive peaks of vibrator voltage appear at the junction 48. The discharged condenser 46 charges to the value of the positive voltage peaks above the quiescent voltage B+ during the conduction period and then discharges toward B+ during the nonconduction period through resistor 44 as shown in FIG. 3A. Thus, when the variable resistor 42 is set at its maximum value, the voltage of the junction 48 is a pulsating voltage always greater than the voltage B+ of the battery 28.

As the value of the resistors 42 is reduced, current flows through resistors 42 and 44 with the result that the quiescent voltage at junction 48 decreases from B+ toward zero, whereby the quiescent charge on the condenser 46 increases correspondingly from zero toward B+. The quiescent voltage B+ at the junction of armature 53 and field coil 55 remains unchanged so that at junction 48 the positive peaks and portions of the negative peaks of the vibrator pulsating voltage appear. The charged condenser 46 then is "discharged" toward the maximum positive pulsating voltage at junction 48 and thereafter "recharged" toward the quiescent voltage at junction 48. Dependent upon the relative selected values of resistors 44 and 50 and the selected range of values for resistor 42, the voltage at junction 48 can be made to vary cyclically above and below B+ in a variable duty cycle. FIG. 3B illustrates a wave form of the voltage at junction 48 for a particular setting of the resistor 42.

From the foregoing description, it will be understood that by changing the setting of the resistor 42, there can be developed at the junction 48 a composite voltage that includes a pulsating component which is always positive with respect to the positive voltage B+ of the battery 28 or a composite voltage which includes portions both positive and negative with respect to the positive voltage of the battery 28. In view of the fact that the resistor 42 can be set at an infinite number of values, the ratio of the negative and positive portions of the pulsating voltage can be adjusted and, more importantly, the relative time durations of the negative and positive portions of the pulsating voltage can be varied.

The voltage-producing section 34 of the control system 10 operates to produce repetitive voltage pulses, in accordance with the composite voltage developed at the junction 48 by the section 32. Thus, the section 34, which is serially connected between the battery 28 and armature winding 14, functions to periodically open the above armature circuit, thereby to produce a plurality of pulses having an amplitude equal to the voltage amplitude of the battery 28. The pulse width of these pulses, and hence the average armature voltage, is controlled by the composite input signal developed by the section 32. Briefly, the section 34 comprises a control transistor T–1 of the PNP type and a plurality of auxiliary transistors T–2, T–3, T–4, T–5, and T–6 of the PNP type having their emitter-collector circuits connected between the battery 28 and the armature 14 via conductors 36 and 30. The control transistor T-1 is periodically rendered conductive when the composite voltage at junction 48 has portions 80 (FIG. 3B) that are more negative than the positive voltage of the battery 28 and as a result of the conduction of the control transistor T-1, the plurality of secondary transistors T-2 through T-6 are likewise rendered conductive.

More specifically, the base B-1 of the transistor T-1 is electrically connected to the junction 48 by conductor 58 so that the base B-1 is biased with respect to its emitter E-1 in accordance with the composite voltage appearing at the junction 48, the emitter E-1 being electrically connected via a conductor 62 and a resistor 60 to the conductor 36 to which the resistor 44 is connected. As long as the base B-1 remains positive with respect to the emitter E-1 of the transistor T-1, no current flows in the base-emitter circuit. However, when the base B-1 becomes negative with respect to the emitter E-1, the base-emitter circuit conducts current with the result that a substantially greater current flows in the collector-emitter circuit of the transistor T-1, the collector being electrically connected to the conductor 30. The collector-emitter circuit of the transistor T-1 is as follows: the battery 28, conductor 36, resistor 60, conductor 62, emitter E-1, collector C-1, conductor 30, armature winding 14, conductor 18, switch 20, field winding 16, conductor 22, and the battery 28. It will be appreciated that the collector-emitter circuit of the transistor T-1 conducts current and, in essence, applies a voltage to the armature winding 16 whenever the base B-1 of the transistor T-1 is negative with respect to the emitter E-1.

The plurality of secondary transistors T-2 through T-6 have their bases B-2 through B-6 respectively connected through resistors 64 to a conductor 66. The conductor 66 is connected to the junction of the conductor 62 and resistor 60 (and hence emitter E-1 of the transistor T-1) through a shunt resistor 68 and capacitor 70. The emitters E-2 through E-6 of the transistors T-2 through T-6 are respectively connected through resistors 72 to the conductor 36. It will be appreciated that the capacitor 70 and the parallel resistor 68 comprise a wave-shaping network which functions to maintain the bases B-2 through B-6 slightly more positive with respect to the emitters E-2 through E-6 when the transistor T-1 is nonconductive. Without the capacitor 70, the bases B-2 through B-6 would be at substantially the same potential as the emitters E-2 through E-6 so that the transistors T-2 through T-6 would not be definitely nonconductive. However, with the capacitor 70, even though no voltage drop is developed across the resistor 60 when the transistor T-1 is non-conductive, the parallel capacitor 70 and resistor 68 cause the voltage of the bases B-2 through B-6 to become slightly more positive than the emitters E-2 through E-6. Thus, since the bases B-2 through B-6 are more positive than the emitters E-2 through E-6, the base-emitter circuits of the transistors E-2 through E-6 do not conduct current. However, in response to the conduction of the transistor T-1 and current flow through its collector-emitter circuit, a voltage drop is developed across the resistor 60 which drives the bases B-2 through B-6 negative with respect to the emitters E-2 through E-6. Consequently, current flows through the base-emitter circuits of the transistors T-2 through T-6, with the result that a substantially greater current flow is obtained through the collector-emitter circuits of the transistors T-2 through T-6. Since the collectors C-2 through C-6 of the transistors T-2 through T-6 are also connected to conductor 30, the collector-emitter circuits of the transistors T-2 through T-6 are connected in parallel across the collector-emitter circuit of the transistor T-1. Accordingly, six parallel current paths through the transistors T-1 through T-6 are provided instead of only one current path through the transistor T-1.

Considering the operations of the circuit of FIG. 1, it is assumed that the forward contacts 20a are closed, the motor on-off switch 40 is open, the large variable resistor 42 is set at its maximum value that no voltage is applied to the armature circuit of the motor 12. If it is desired to start the motor 12, the motor on-off switch 40 is closed, whereby the vibrator-diode arrangement 52 produces a composite voltage at junction 48. With the variable resistor 42 set at its maximum value, the voltage, shown in FIG. 3A, comprises a pulsating voltage more positive than the positive voltage of the battery 28. This voltage appears between the base B-1 and emitter E-1 of the transistor T-1, whereby the base B-1 is biased positive with respect to the emitter E-1 so that no current flows through the base-emitter circuit of the transistor T-1 at any time. Accordingly, the control system produces no armature voltage and the motor 12 remains in an inoperative condition.

The motor 12 is actually started by adjusting the variable resistor 42 to decrease its value such that the lower peaks of the pulsating voltage conducted by the rectifier 56 become negative with respect to the positive voltage of the battery 28, thereby to bias the base B-1 of the transistor negative with respect to the emitter E-1. These negative peaks are identified in FIG. 3B by reference numeral 80. Hence, during the time intervals that the base B-1 is negative with respect to the emitter E-1, the base-emitter circuit of transistor T-1 conducts current, whereby the collector-emitter circuit of the transistor T-1 also transmits current to supply a voltage pulse to the armature circuit of the motor 12.

More particularly, when the collector-emitter circuit of the transistor T-1 conducts current, a voltage drop occurs across the resistor 60, thereby making the emitter E-1 and the bases B-2, B-3, B-4, B-5 and B-6 more negative with respect to the emitters E-2, E-3, E-4, E-5 and E-6. Consequently, current flows in the base-emitter circuits of transistors T-2 through T-6, with the result that substantially more current flows through the collector-emitter circuits of transistors T-2 through T-6. Hence, when the lower peaks of the composite voltage at the junction 48 are more negative with respect to the positive voltage of the battery 28, the collector-emitter circuits of all of the transistors T-2 through T-6 are rendered conductive to provide a voltage pulse for the armature circuit of the motor 12.

It will be appreciated that when the upper peaks 82 of the composite voltage at the junction 48 are positive with respect to the positive voltage of the battery 28, the base B-1 becomes positive with respect to the emitter E-1 and current flow in the base-emitter circuit of the transistor T-1 is stopped. Accordingly, conduction in the collector-emitter circuit of transistor T-1 is stopped, whereby the voltage drop across the resistor 60 becomes zero. Thus, the bases B-2 through B-6 of the transistors T-2 through T-6 do not remain more negative with respect to their associated emitters E-2 through E-6. Accordingly, the current flow in the base-emitter circuits of the transistors T-2 through T-6 is stopped and the secondary transistors T-2 through T-6 become nonconductive. In short, the transistors T-1 through T-6 are rendered conductive to produce a positive armature pulse when portions of the composite voltage are negative with respect to the positive voltage of the battery 28 and are rendered nonconductive to produce no armatured voltage when portions of the A.C. voltage are positive with respect to the positive voltage of the battery 28.

Although the base to emitter voltage of the transistor T-1 is somewhat of a clipped sinusoidal, as seen in FIGS. 3A and 3B, the base to emitter voltages of the transistors T-2 through T-6 are somewhat square wave, as indicated in FIG. 3C and the voltage supplied to the armature circuit of the motor 12 is substantially square wave, as indicated in FIG. 3D. Irrespective of the exact wave form applied to the armature circuit of the motor 12, the voltage pulses developed by the transistors T-1 through T-6 produce an average armature voltage (indicated by a dotted line) which causes the motor 12 to rotate at a predetermined speed. This result is obtained since the speed of the motor, as is well known, is directly proportional to the voltage applied to its armature winding.

If it be assumed that the variable resistor 42 is set so that the base-emitter voltage on the transistor T-1 is as illustrated in solid line in FIG. 3B, the motor 12 rotates at the predetermined speed. However, if it is desired to increase the speed of the motor 12, the resistor 42 is adjusted to further decrease its resistance. The decrease in resistance of the resistor 42 causes the entire level of the conducted pulsating voltage to be decreased with respect to the positive voltage of the battery 28. Consequently, the base B-1 of the transistor T-1 is driven negative with respect to the emitter E-1 for longer periods of time. Accordingly, the time intervals of conduction of the transistor T-1 is increased, with the result that the voltage drop across the resistor 60 in the collector-emitter circuit of transistor T-1 exists for greater periods of time whereby the bases B-2 through B-6 are rendered negative with respect to the emitters E-2 through E-6 for longer periods of time. Whereas the base-emitter circuits were conductive for approximately fifty percent of the time, as indicated in solid lines in FIG. 3C, the base-emitter circuits are now conductive for approximately sixty-five percent of the time as indicated in dashed lines in FIG. 3C. Consequently, the width of the voltage pulses supplied to the armature circuit of the motor 12 is increased, as indicated by dashed lines in FIG. 3D. Accordingly, the average armature voltage is increased from the level indicated by the dotted line to the level indicated by the dash-dot line. With an increase in the average armature voltage, the speed of the motor 12 increases.

From the foregoing description, it will be appreciated that the speed of the motor 12 can be regulated and set at any predetermined value by the simple expedient of adjusting the resistor 42. The resistor 42 controls the time intervals of conduction of the transistors T-1 through T-6 and, accordingly, determines the width of the armature voltage pulses, which, as indicated above, control the magnitude of the average armature voltage. The variable resistor 42 can be adjusted to produce an infinite number of resistance values, whereby an infinite number of motor speeds are obtainable.

For rapid acceleration of the motor or application of full motor power, the transistors T-1 through T-6 can be shorted or bypassed by an acceleration switch 80 which is connected across conductors 30 and 36 by conductor 82, illustrated in dotted lines.

Considering now FIG. 2, the control system 10 may also be used with a motor of the shunt type. As illustrated, the control system 10 has substantially the identical construction as illustrated in FIG. 1 and is likewise embodied in the armature circuit of a shunt motor 112. The shunt motor 112 embodies an armature 114 that is serially connected via conductor 118 to the negative terminal of the battery 28 and via conductor 130 to the control system 10 which is serially connected to the positive terminal of the battery 28 via a conductor 136. In addition, the motor 112 includes a field winding 116 electrically connected across the battery 28. Similar to the series motor 12, the motor 112 embodies a reversing switch 120. However, in contrast to the switch 20, the reversing switch 120 has two forward positions, a forward low position for obtaining high torque and relatively low speed and a forward high position for obtaining a relatively higher speed and relatively lower torque. More particularly, the high forward contacts 20a and 20c operate to connect the field winding end 116a to the negative terminal of the battery 28 and the field winding end 116b to the positive terminal of the battery 28 through a variable resistor 143 ganged to the variable resistor 42. The lower forward contacts 20b and 20c connect the winding end 116a to the negative terminal of the battery 28 and connect the winding end 116b directly to the positive terminal of the battery 28. On the other hand, the reversing contacts 20d and 20e connect the winding end 116b to the negative terminal of the battery 28 and the winding end 116a to the positive terminal of the battery 28.

The control system 10 is identical in construction to the control system described, with the exception that the variable resistor 42 is ganged with the variable resistor 143 associated with the forward and reversing switch 120. In the interest of avoiding unnecessary repetition, the same reference numerals are used to identify the identical components in the control system illustrated in FIG. 2 as is illustrated in FIG. 1. Furthermore, the control system 10 operates identically to the manner described above and regulates the speed of the motor 112 by the simple expedient of adjusting the variable resistor 42 and also the ganged resistor 143.

For rapid acceleration of the motor 12 or application of full motor power, the transistors T-1 through T-6 can be bypassed or shorted by means of a switch 180 which is connected similarly to switch 80, across conductors 130 and 136 by a conductor 132 illustrated in dotted lines. In order to provide regenerative braking for the shunt motor, the transistors T-1 through T-6 can be shunted with a back rectifier, identified by reference numeral 190, associated switch 192, and resistor 194, the above arrangement being connected between conductors 130 and 136 via conductor 182.

While the embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A speed regulating system for an electric motor comprising a power source, a voltage path from said power source through the armature of said motor, an electron flow device including an input electrode and and output electrode and a control electrode for selectively completing and interrupting said voltage path, a source of variable fixed bias including a charging capacitor across the input electrode and control electrode of said flow device for controlling the amount of cut-off bias applied to said electron flow device, and a source of cyclically varying signal applied across said input electrode and said control electrode for bucking said cut-off bias and for controlling said electron flow device to cyclically complete said voltage path.

2. A speed regulating system for an electric motor comprising a power source, a voltage path from said power source through the armature of said motor, an electron flow device including an input electrode and an output electrode and a control electrode for selectively completing and interrupting said voltage path, a source of variable fixed bias including a parallel resistor and capacitor across said input electrode and said control electrode and a variable resistor in series therewith across said power source for controlling the amount of charge on said capacitor and accordingly the amount of cut-off bias applied to said electron flow device, a unidirectional conducting device, and a source of cyclically varying signal applied across said input electrode and said control electrode via said unidirectional conducting device for bucking said cut-off bias and for controlling said electron flow device to cyclically complete said voltage path.

3. A speed regulating system for an electric motor comprising a power source, a voltage path from said power source through the armature of said motor, an electron flow device including an input electrode and an output electrode and a control electrode for selectively completing and interrupting said voltage path, a source of variable fixed bias including a parallel resistor and capacitor across said input electrode and said control electrode and a variable resistor in series therewith across said power source for controlling the amount of charge on said capacitor and accordingly the amount of cut-off bias applied to said electron flow device, a unidirectional conducting device, and a vibrator arrangement across said power source providing a cyclically varying signal between said input electrode and said control electrode via said unidirectional conducting device for bucking said cut-off bias and for controlling said electron flow device to cyclically complete said voltage path, so that with said variable resistor at maximum resistance said capacitor is substantially discharged and said electron flow device is held continuously at cut-off and with said variable resistor at other resistance values said capacitor is charged accordingly and corresponding peak portions of said cyclically varying signal overcome said cut-off bias and complete said voltage path for corresponding periods.

4. The speed regulating system set forth in claim 3 wherein said voltage path includes multiple low impedance parallel paths controlled from said electron flow device for providing instantaneous voltage control to said armature during each of the voltage path completion periods.

References Cited in the file of this patent

UNITED STATES PATENTS

| | | |
|---|---|---|
| 2,549,654 | Wittenburg | Apr. 17, 1951 |
| 2,707,261 | Prior | Apr. 26, 1955 |
| 2,780,763 | Hertwig et al. | Feb. 5, 1957 |